(12) United States Patent
Simons et al.

(10) Patent No.: US 9,064,237 B2
(45) Date of Patent: Jun. 23, 2015

(54) COLLABORATIVE COMMUNICATION IN A WEB APPLICATION

(75) Inventors: Nicholas Michael Simons, Redmond, WA (US); Jonathan Bailor, Bellevue, WA (US); Christopher J. Brown, Redmond, WA (US); Sugandha S. Kapoor, Sammamish, WA (US); Dong Ming, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 134 days.

(21) Appl. No.: 13/356,224

(22) Filed: Jan. 23, 2012

(65) Prior Publication Data

US 2013/0191720 A1 Jul. 25, 2013

(51) Int. Cl.
| | |
|---|---|
| G06F 17/22 | (2006.01) |
| G06Q 10/10 | (2012.01) |
| G06F 3/0481 | (2013.01) |
| G06F 17/24 | (2006.01) |
| G06F 17/30 | (2006.01) |

(52) U.S. Cl.
CPC ............ *G06Q 10/101* (2013.01); *G06F 3/0481* (2013.01); *G06F 17/2247* (2013.01); *G06F 17/241* (2013.01); *G06F 17/30882* (2013.01); *G06Q 10/107* (2013.01)

(58) Field of Classification Search
USPC ......... 715/201, 202, 203, 204, 205, 207, 208, 715/209, 230, 232, 234, 243, 255, 256, 731, 715/760, 762, 763, 764, 785, 786, 787, 790, 715/791
See application file for complete search history.

(56) References Cited

U.S. PATENT DOCUMENTS

| | | | |
|---|---|---|---|
| 6,865,713 B1 * | 3/2005 | Bates et al. ................... | 715/233 |
| 7,107,518 B2 | 9/2006 | Ramaley et al. | |
| 7,346,841 B2 * | 3/2008 | Kuruoglu et al. ............. | 715/751 |
| 7,346,846 B2 * | 3/2008 | Rossi et al. ................... | 715/705 |
| 7,356,537 B2 | 4/2008 | Reynar et al. | |
| 7,640,506 B2 * | 12/2009 | Pratley et al. ................. | 715/751 |
| 7,702,798 B2 | 4/2010 | Apreutesei et al. | |
| 7,703,000 B2 | 4/2010 | Barrie et al. | |
| 7,707,249 B2 | 4/2010 | Spataro et al. | |

(Continued)

OTHER PUBLICATIONS

M. Gregory "Collaboration and end-user information management tools", AMCIS, 2010, pp. 1-11.*

(Continued)

*Primary Examiner* — Maikhanh Nguyen
(74) *Attorney, Agent, or Firm* — Steve Crocker; Jim Ross; Micky Minhas

(57) ABSTRACT

A document accessible on a network may be opened by multiple users. A user may use a thin client application to access the document, wherein an image of the document and XML data including comments and locations of the comments in the document. Hint icons are displayed in the document where comments are anchored. Upon selection of a hint, an HTML comments pane may be displayed to a side of the document, exposing comments and replies to comments currently stored in the document. The comments pane may be scrolled to the comment associated with the selected hint. Additionally, highlighting may be provided over elements in the document associated with a selected comment. Comments may be added via the comments pane and saved to the document on the network. Comments and comment location data may be communicated to other clients, allowing for collaborative communication via a thin client application.

17 Claims, 17 Drawing Sheets

(56) References Cited

U.S. PATENT DOCUMENTS

| | | | |
|---|---|---|---|
| 7,734,692 B1 | 6/2010 | Kaplan et al. | |
| 7,818,678 B2 * | 10/2010 | Massand | 715/751 |
| 7,958,453 B1 * | 6/2011 | Taing | 715/744 |
| 7,962,853 B2 | 6/2011 | Bedi et al. | |
| 8,046,259 B1 | 10/2011 | Siegel et al. | |
| 8,086,960 B1 | 12/2011 | Gopalakrishna et al. | |
| 8,533,238 B2 * | 9/2013 | Yu et al. | 707/805 |
| 2002/0078088 A1 * | 6/2002 | Kuruoglu et al. | 707/512 |
| 2003/0093531 A1 | 5/2003 | Yeung et al. | |
| 2005/0268234 A1 * | 12/2005 | Rossi et al. | 715/705 |
| 2006/0053195 A1 | 3/2006 | Schneider et al. | |
| 2006/0080432 A1 | 4/2006 | Spataro et al. | |
| 2006/0282762 A1 | 12/2006 | Diamond et al. | |
| 2007/0118598 A1 | 5/2007 | Bedi et al. | |
| 2007/0143663 A1 | 6/2007 | Hansen et al. | |
| 2007/0271502 A1 | 11/2007 | Bedi et al. | |
| 2009/0006568 A1 | 1/2009 | Messenger et al. | |
| 2009/0249224 A1 * | 10/2009 | Davis et al. | 715/753 |
| 2010/0095198 A1 | 4/2010 | Bultrowicz et al. | |
| 2010/0241972 A1 | 9/2010 | Spataro et al. | |
| 2010/0281154 A1 | 11/2010 | Bedi et al. | |
| 2010/0313114 A1 | 12/2010 | Colbran | |
| 2012/0005596 A1 | 1/2012 | Carlson et al. | |
| 2012/0023418 A1 | 1/2012 | Frields et al. | |
| 2012/0084215 A1 | 4/2012 | Trier et al. | |
| 2012/0192055 A1 | 7/2012 | Antebi et al. | |
| 2012/0284618 A1 | 11/2012 | Bailor et al. | |
| 2014/0032481 A1 * | 1/2014 | Lang | 707/607 |

OTHER PUBLICATIONS

Lebow et al. "New Technology for Empowering Virtual Communities", 2009, pp. 1066-1071.*

"Dynamic Collaboration for Efficient, Effective Multi-Contributor Document Review and Analysis," Retrieved at https://www.hylighter.com/hybar/site/docs/documents/ HyLighter_white_paper2.0.pdf, 7 pages (Retrieved Date Feb. 21, 2011).

"The Evolution of the Soapbox," Retrieved at http://blogs.msdn.com/1b/microsoft_office_word/archive/2007/11/01/the-evolution-of-the-soapbox.aspx, 4 pages (Nov. 2, 2007).

International Search Report and Written Opinion for PCT/US2012/036699 mailed Nov. 28, 2012.

International Search Report and Written Opinion for PCT/US2013/022354 mailed Jun. 4, 2013.

Lebow, David G., "Document Review Meets Social Software and the Learning Sciences," Retrieved at https://www.hyligher.com/hylighter/website/docs/ HyLighter_jelks_distribute.pdf, 8 pages (Feb. 2009).

* cited by examiner

FIG 2

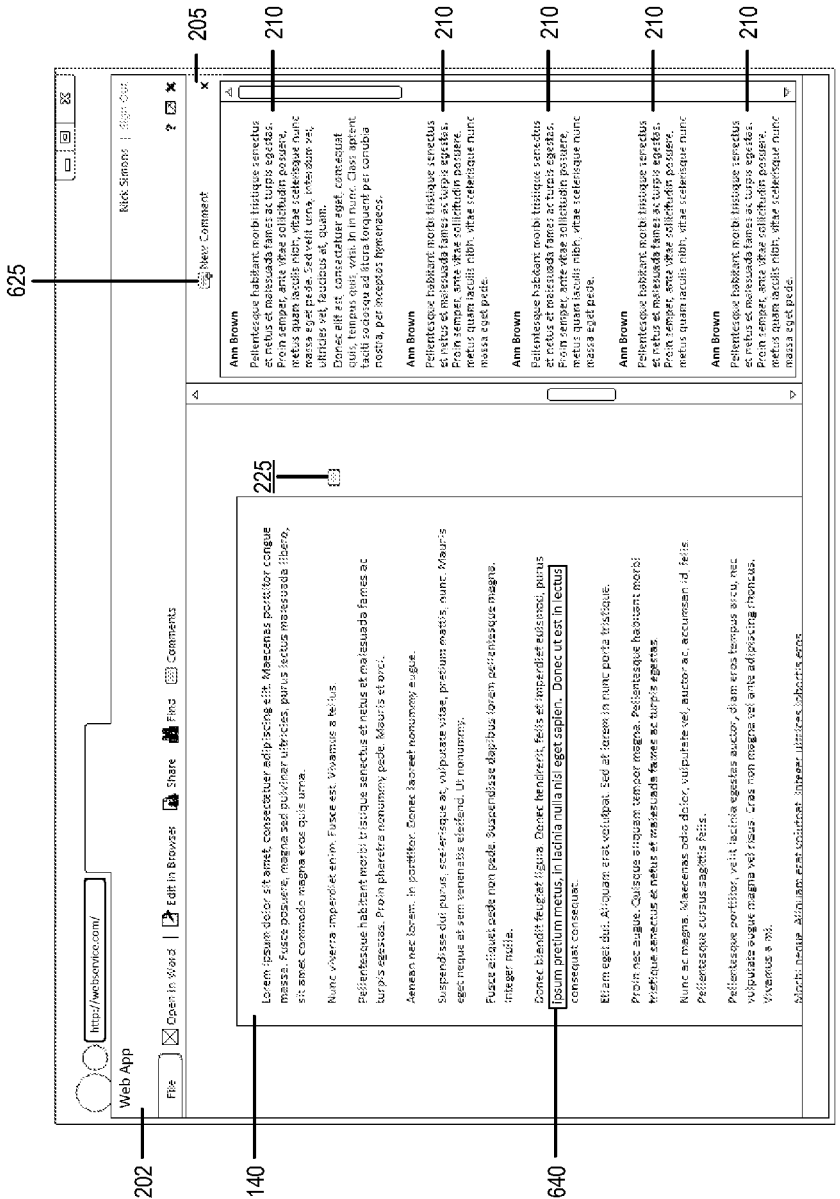

COLLABORATIVE COMMUNICATION IN A WEB APPLICATION

BACKGROUND

It is common for a collaborative review process to be used in the development of electronic documents. Typically in such as process, one or more users may access a document, evaluate the content, and deliver feedback and changes via comments. Comments may allow users to discuss and annotate content of a document. It is a growing trend for users to use online companions to client software applications to view and edit documents stored on a server via a thin client, such as a web browser.

Such applications provide many of the same editing features as a rich client application. Current thin client applications may allow users to view comments contained in a document, but do not allow for users to interact with the comments. Some current thin client applications may allow users to add comments; however, current application do not provide for allowing users to add comments and to see where in the document a comment is anchored.

It is with respect to these and other considerations that the present invention has been made.

SUMMARY

Embodiments of the present invention solve the above and other problems by providing commenting functionalities via a thin client application. According to embodiments, a user may request a document saved on a server via a thin client application, such as a web browser application. An image of the server-based document may be sent to a client device for viewing and editing. An extensible markup language (XML) file may be sent from the server comprising comments already left in the document, as well as positions of the comments in the document. A hypertext markup language (HTML) overlay may be displayed over the document image highlighting the positions of the comments. Embodiments allow users to add comments to the server-based document via the thin client application via an HTML comments panel provided to a side of the document image. Upon entering a comment or a reply to a comment, the comment is communicated to the server and saved to the document. Comments and comment location data may be communicated to other clients, allowing for collaborative communication via a thin client application.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings:

FIG. 2 is an illustration of an example screenshot with a document image displayed in a browser application window and a comments pane displayed to a side of the document image according to embodiments;

FIG. 6A is an illustration of an example screenshot of a document image wherein a single line of text is selected for an insertion of a comment associated with the selected text;

FIG. 6B is an illustration of the same document image of FIG. 6A after an indication of a selection of a "new comment" command is received in associated with the selected text;

FIG. 8 is an illustration of an example screenshot of a document image and comments, replies to comments, and a comment edit box displayed in a comments pane;

FIGS. 9A and 9B show commenting UI elements;

FIG. 11 is an illustration of an example screenshot showing a comment selected via selection of a hint associated with the comment;

DETAILED DESCRIPTION

Figure 1:
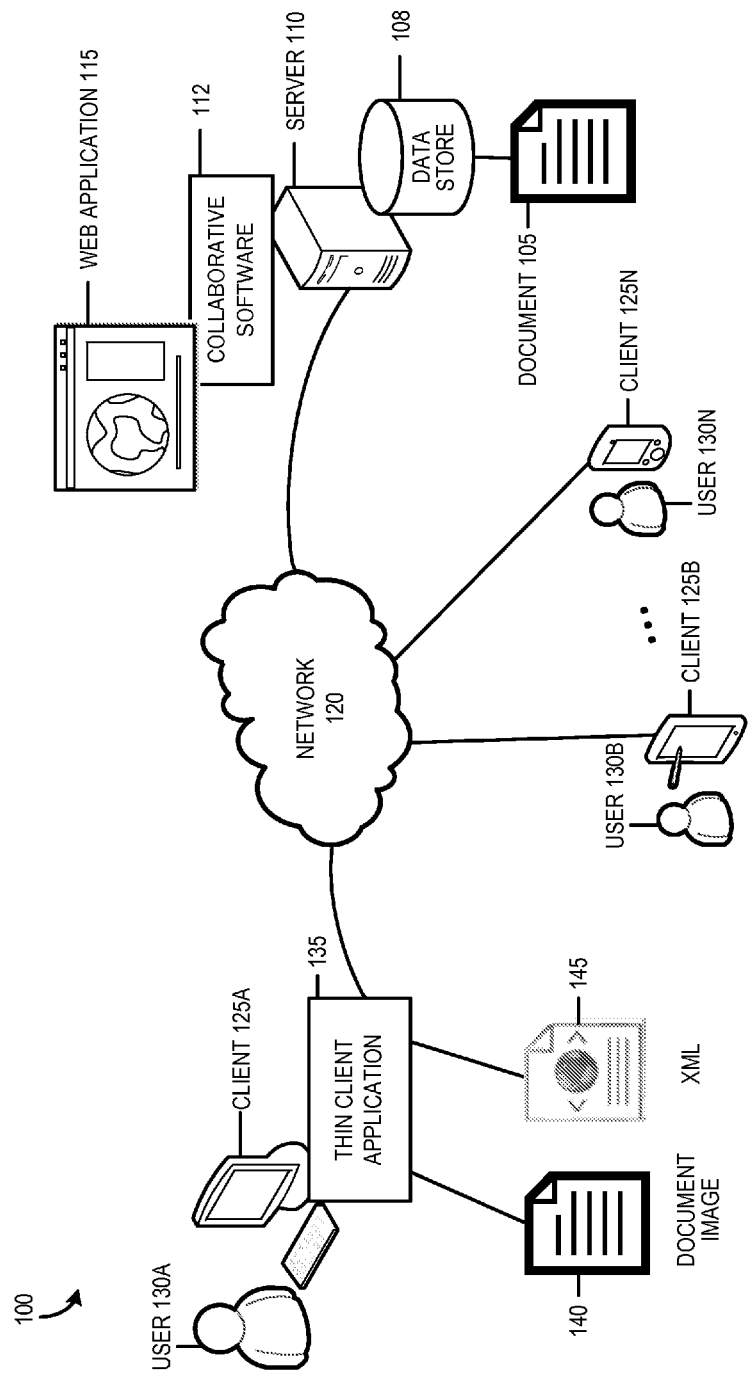
FIG. 1 is an illustration of a system architecture for providing collaborative communication in a web application according to embodiments.

As briefly described above, embodiments of the present invention are directed to providing commenting functionalities via a thin client application. The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Referring now to the drawings, in which like numerals represent like elements through the several figures, aspects of the present invention and the exemplary operating environment will be described. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 is a simplified block diagram illustrating a system architecture for providing collaborative communication in a web application. The system 100 includes one or more client devices 125A-N (referred to collectively or individually as client devices 125), communicatively connected to a server device 110 (or a plurality of server devices) by way of a network 120, such as an intranet, extranet, and the Internet. The one or more client devices 125 may include a thin client application 135, for example, a web browser application, operable to allow users 130A-N (referred to collectively or individually as users 130) to access documents 105 as well as share files and collaborate with other users online. The one or more client devices 125 may be one of a variety of suitable computing devices described below with reference to FIGS. 12 through 14. The server 110 may be any of a number of types of computing devices executing one or more software programs typically in a networked environment; however, a server may also be implemented as a virtual server (software programs) executed on one or more computing devices viewed as a server on the network. In certain embodiments, server 110 may include collaborative software 112, such as SharePoint® server software by Microsoft Corporation® of Redmond, Wash.

One or more rich web applications 115 may be run on one or multiple servers 110 and may manage requests from a web front-end component, cache renditions, store, calculate, and render documents 105 for consumption by thin client applications 135. Documents 110 may be stored in a data store 108 that may be accessed by various users 130 in various locations, for example, via a thin client application 135 connected to a network 120. A thin client application 135 may be a web-based version of an application, for example, a word processing application (e.g., Word® by Microsoft Corporation® of Redmond, Wash.), a spreadsheet application (e.g., Excel® by Microsoft Corporation® of Redmond, Wash.), a presentation application (e.g., PowerPoint® by Microsoft Corporation® of Redmond, Wash.), and a planner and note taking application (e.g., OneNote® by Microsoft Corporation® of Redmond, Wash.), and may enable a user to access documents 105 and edit documents online. The one or more web applications 115 may use standard transports, encodings, and protocols to exchange information on various platforms via various networks 120, and may utilize a set of standards that describe the syntax and semantics of software communication. The web applications 115 giver users 130 a browser-based viewing and editing experience by providing a representation 140 of a document 105 using native browser objects such as hypertext markup language (HTML), JavaScript, and images.

As described briefly above, it is common for a collaborative review process to be used in the development of electronic documents. Oftentimes in a collaborative review process, users 130 leave comments on specific portions of a document 105. Embodiments of the present invention allow collaborators (users 130) to comment on, reply to, and manage comments from a thin client 135 without a need for specific client software. When a web-based document 105 is accessed via a thin client 135 such as a browser application 135, a representation of the document, herein referred to as a document image 140, may be provided. The document image 140 may provide a high-fidelity version of the document 105. According to one embodiment, the document image 140 may be a bitmap image. Extensible Markup Language (XML) data 145 associated with a document may be provided in a response to a request from a client, the XML data including such data as the structure of the document 105, comments that may already exist in the document, and positions of the comments in the document.

Figure 2:
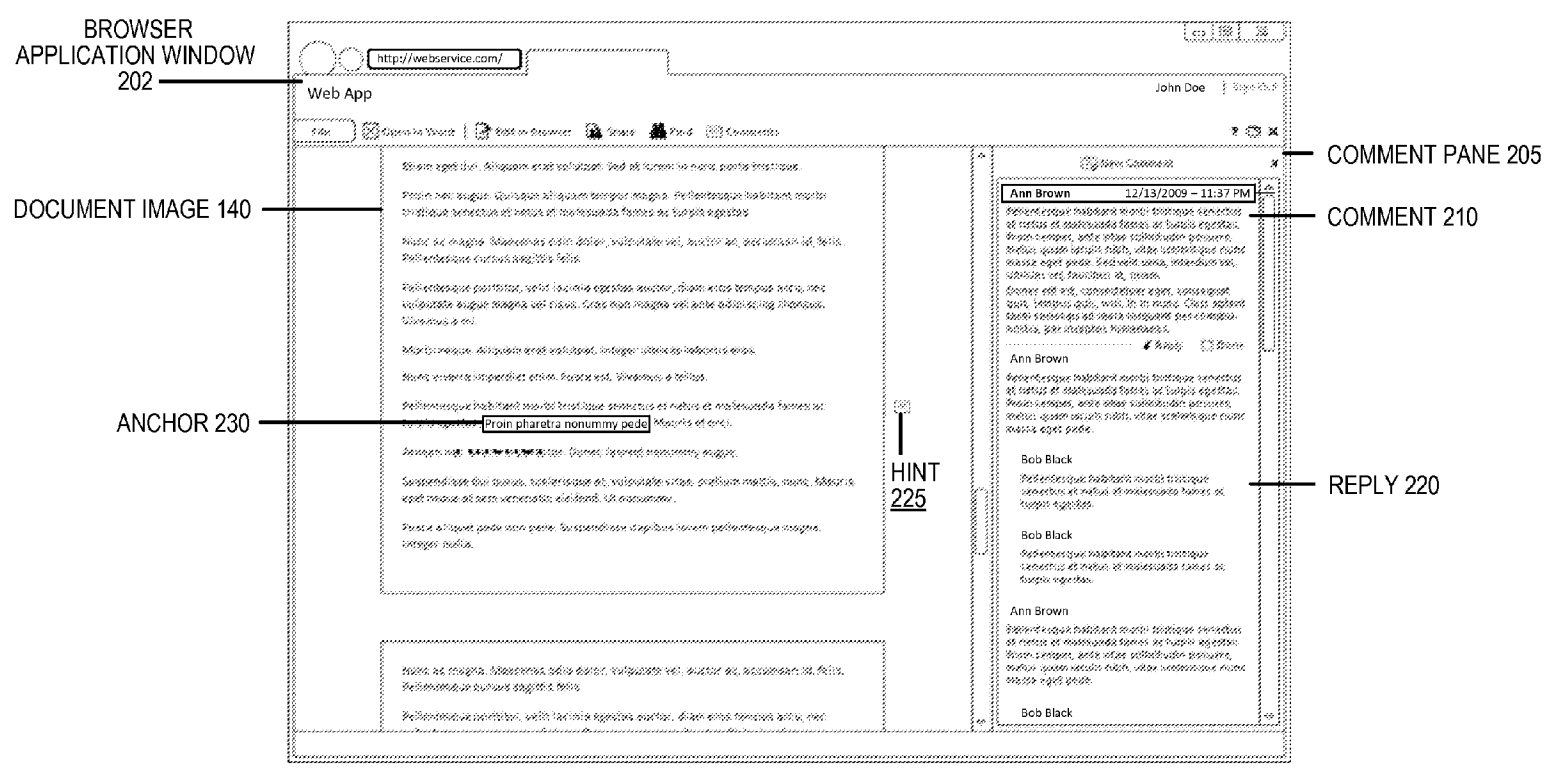

Referring now to FIG. 2, an example document image 140 is shown displayed in a browser application window 202. Although the example document image 140 is illustrated is an image of a word processing document 105, the document 105 may be one of various types of documents such as, but not limited to, word processing documents, spreadsheet documents, slideshow presentation documents, planning and notetaking documents, etc. The document 105 may contain one or more comments associated with selected portions of the document. A selectable control, such as an HTML icon, may be provided as an overlay over the document image 140 to notify a user 130 where a comment may be anchored. This overlaid selectable HTML icon will herein be referred to as a "hint" 225. For example, as illustrated in FIG. 2, a hint 225 may be a selectable icon displayed to the side of a document image 140 where a comment is anchored. According to one embodiment, a hint 225 may represent all the comments in a single paragraph in a document 105. If a document contains multiple columns of paragraphs, such as with tables or snaking columns, a single hint 225 may represent all the columns' comments.

Upon selection of a hint 225, an object, such as an HTML object, may be presented as an overlay over the document image 140 provided as a highlighting over the selected portion of the document associated with a comment, herein referred to as an "anchor" 230. The locations of the hints 225 and anchors 230 may be provided in the XML data 145 sent from the server 110. Additionally upon selection of a hint 225, if a comments pane 205 is not already opened, a comments pane 205 may be displayed to a side of the document image 140. According to embodiments, the comments pane 205 may be an HTML pane. The comments pane 205 may comprise the selected comment 210, as well as other comments and replies 220 to comments. According to embodiments, upon selection of a hint 225 the comments pane 205 may be scrolled to the comment 210 associated with the selected hint. Additionally, the selected comment 210 may be highlighted.

Figure 3:
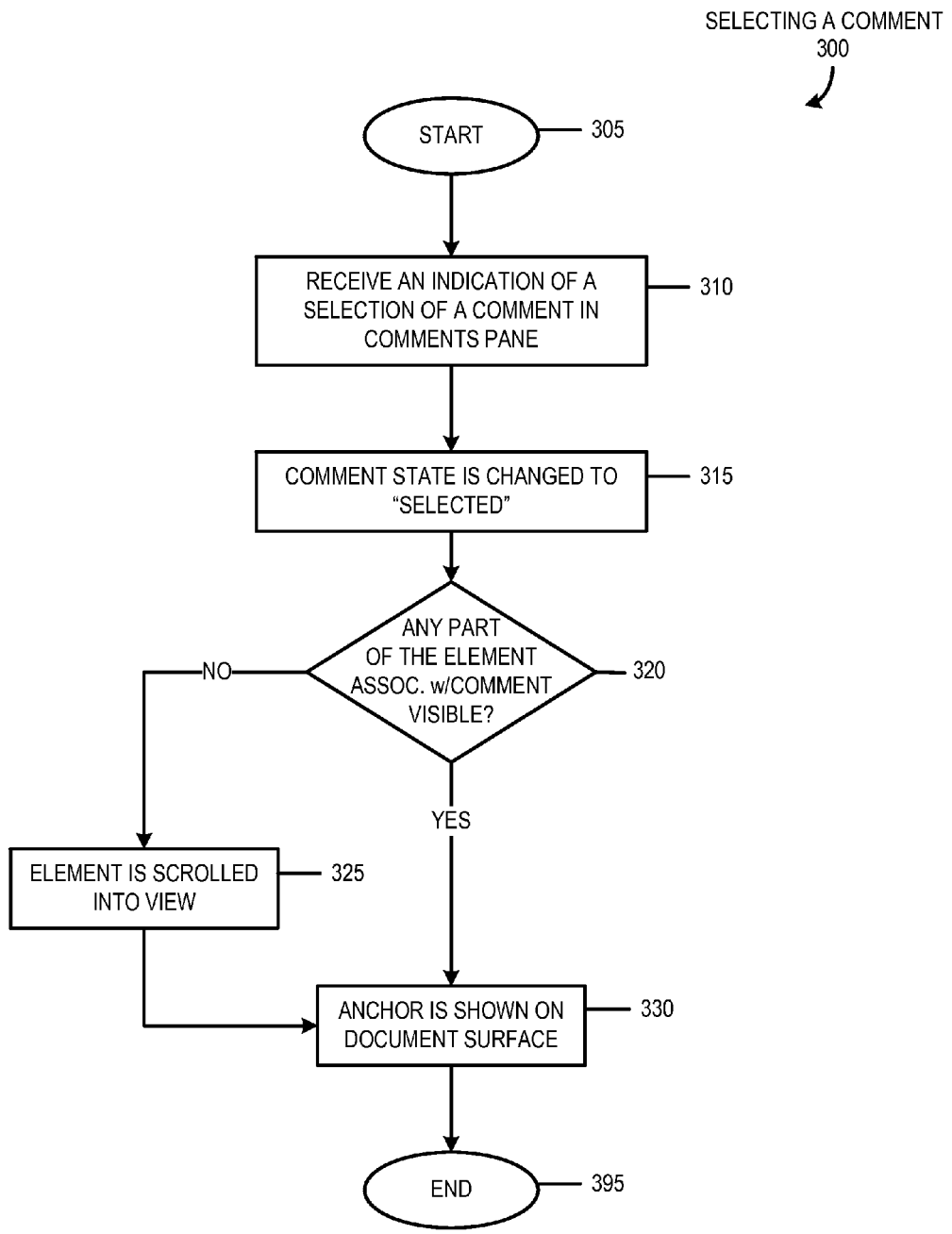
FIG. 3 is a flow chart of a method for selecting a comment displayed in a comments pane according to an embodiment.
Figure 4A:
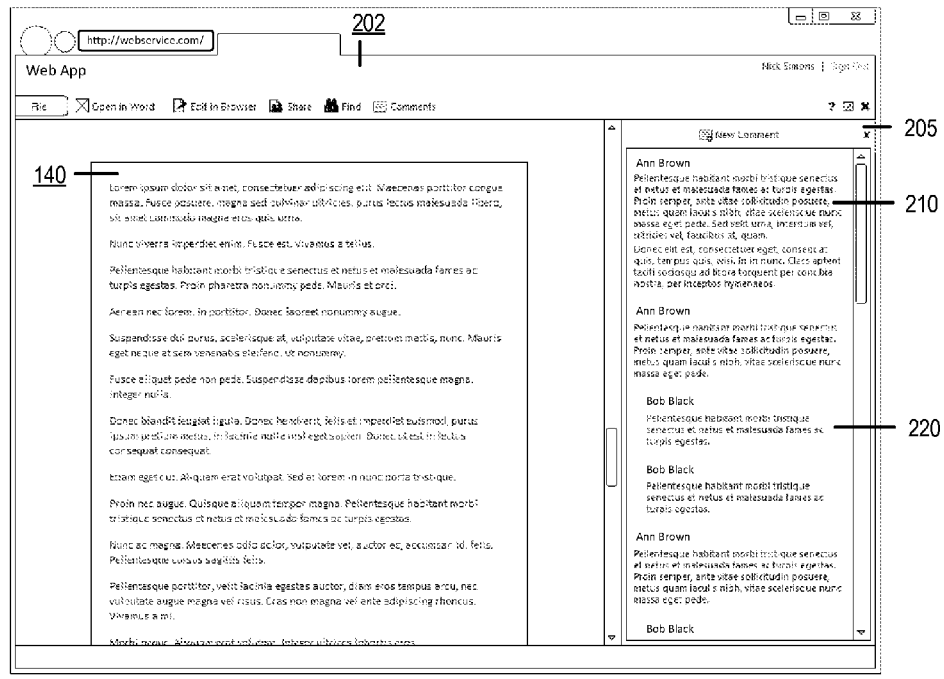
FIG. 4A is an illustration of a screenshot of a document image and a comments pane wherein a comment is not selected.
Figure 4B:
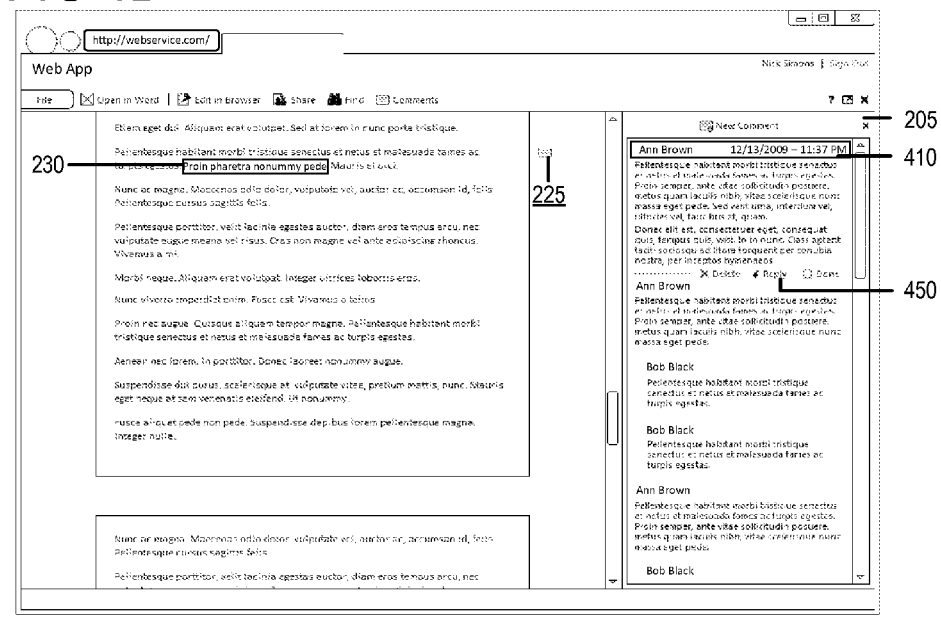
FIG. 4B is an illustration of the document image and comments pane in FIG. 4A after a comment has been selected in the comments pane.

FIG. 3 is a flow chart of a method 300 for selecting a comment 210 displayed in a comments pane 205. Reference may be made to FIGS. 4A and 4B. FIG. 4A is an illustration of a screenshot of a document image 140 and a comments pane 205 wherein a comment 210 is not selected. FIG. 4B shows the same document image 140 and comments pane 205 after a comment 210 has been selected in the comments pane 205. Referring now to FIG. 3, in the embodiment shown, the method 300 starts at OPERATION 305. Upon receiving an indication of a selection of a comment 210 in a comments pane 205 (310), a comment state associated with the comment may be changed to "selected" (315). As can be appreciated, a comment 210 may be selected via various selection methods, for example but not limited to, a selection via a mouse, a selection via touch on a touchscreen interface, or via a keyboard command. According to an embodiment, if another comment is currently selected, upon selection of another comment, the currently selected comment will be deselected.

A determination may be made to determine if any part of the element associated with the selected comment 210 is visible (320). For example, referring to FIG. 4A, a hint 225 is not displayed to the side of the document image 140. Accordingly, text associated with comments 210,220 in the comments pane 205 is not visible at the current displayed position of the document image 140. If the element associated with the selected comment 210 is not visible, the document image 140 may be scrolled so that the element is displayed (325). As illustrated in FIG. 4B, the document image 140 has been scrolled so that the hint 225 and the text associated with the selected comment 410 are in view. After the element associated with the selected comment 210 is scrolled into view (325) or if the element is already visible, an anchor 230 displayed as highlighting may be provided as an HTML overlay over the associated element (330). Additionally, according to an embodiment, the selected comment 410 in the comments pane 205 may be highlighted. The method ends at OPERATION 395.

Figure 5A:
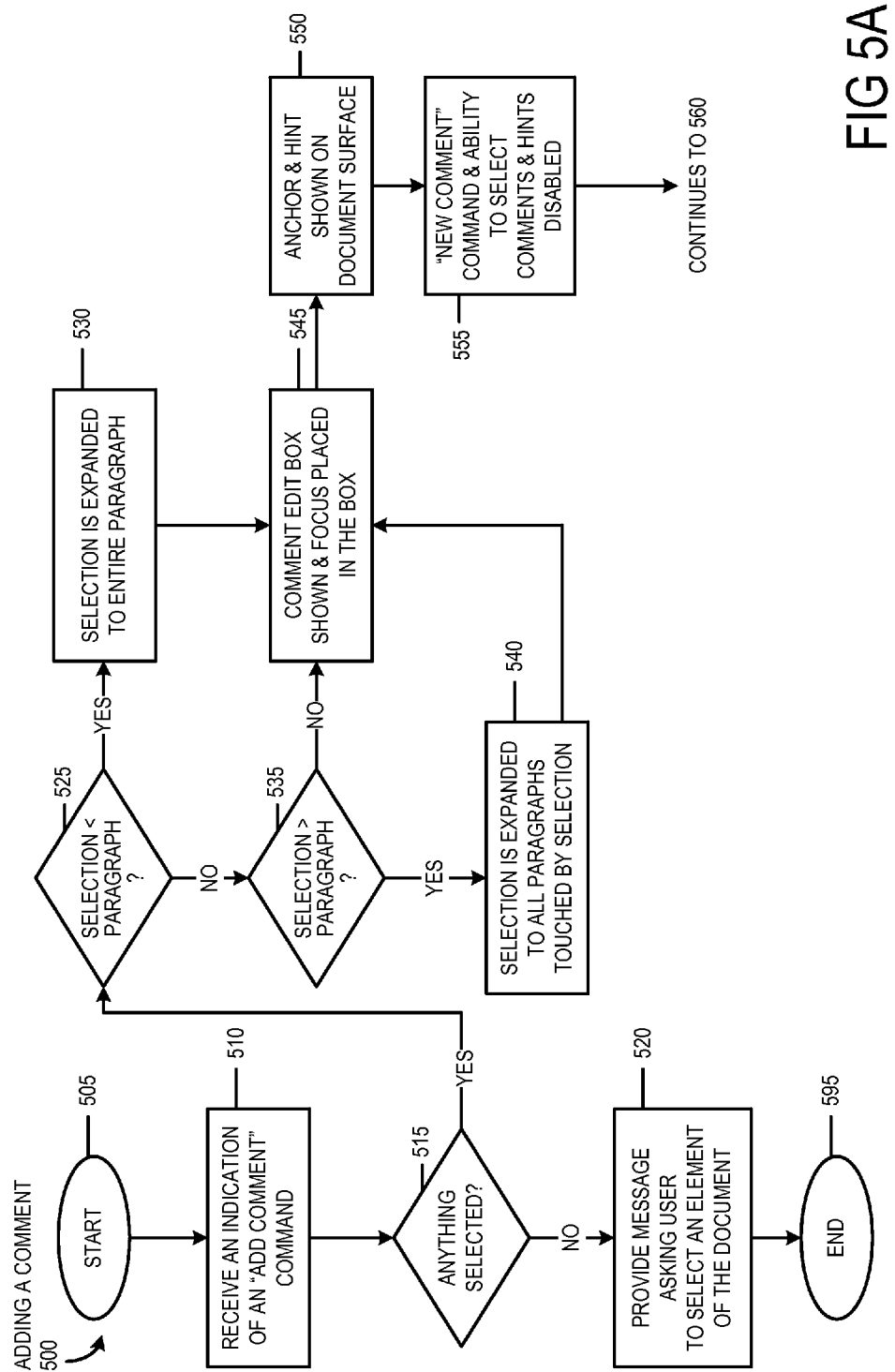
FIGS. 5A and 5B is a flow chart of a method for adding a comment via a thin client according to an embodiment.
Figure 5B:
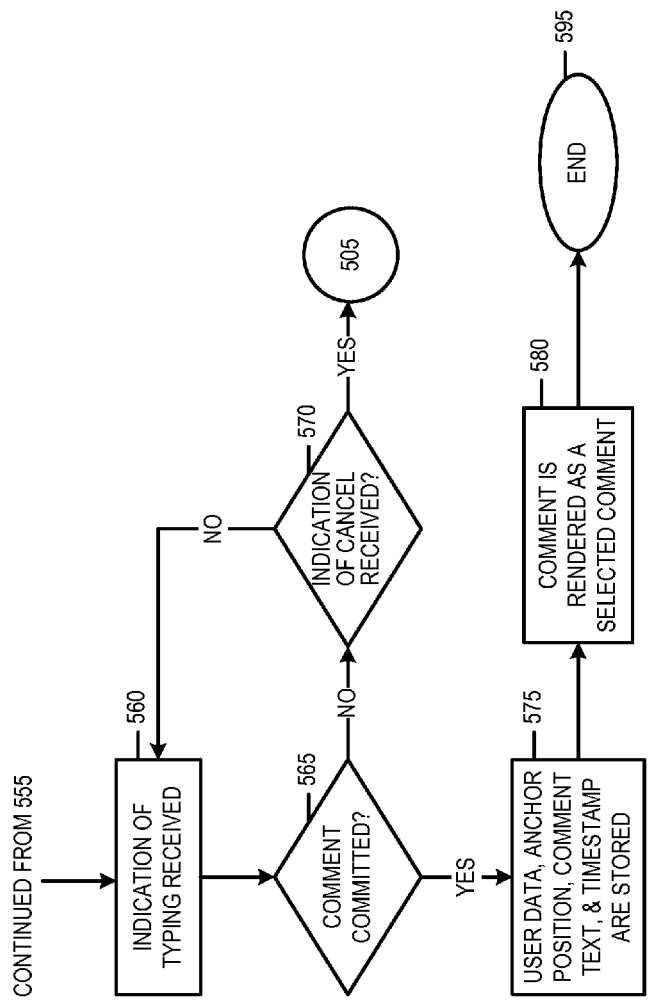
Figure 6B:
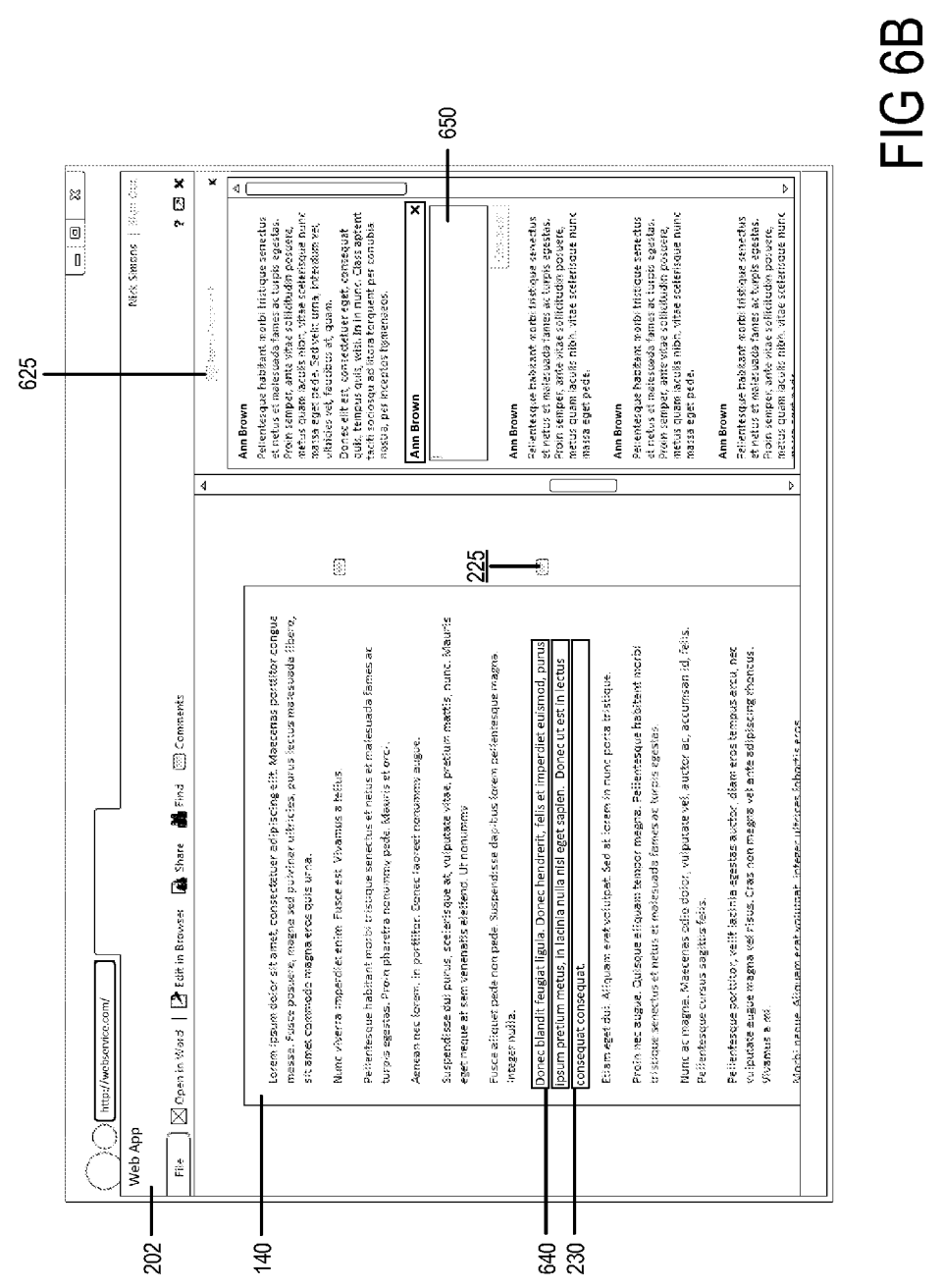

Embodiments of the present invention provide for adding comments 210 to a web-based document 105 via a thin client 135, such as a web browser application. FIGS. 5A and 5B illustrate a flowchart of a method 500 for adding a comment via a thin client 135. Reference may be made to FIGS. 6A and 6B. FIG. 6A is an illustration of an example screenshot of a document image 140 wherein a single line of text is selected for an insertion of a comment associated with the selected text. FIG. 6B is an illustration of the same document image 140 after an indication of a selection of a "new comment" command is received in associated with the selected text in FIG. 6A. Referring now to FIG. 5A, in the embodiment shown, the method 500 starts at OPERATION 505. Upon receiving an indication of a selection of a "new comment" command 625 (510), a determination is made to determine if an element (e.g., text, graph, cell, image, etc.) of the document image 140 of a web-based document 105 is selected (515). If an element is not selected, a message may be provided requesting the user 130 to select an element of the document (520). If it is determined that an element of the document image 140 is selected, a determination may be made to determine if the selection 640 is less than or greater than a paragraph (525). If the selection 640 is less than a paragraph (as shown in FIG. 6A), the selection may be expanded to the entire paragraph (530) (as shown in FIG. 6B). If the selection 640 is greater than a paragraph (535), the selection may be expanded to all paragraphs touched by the selection (540). As can be appreciated, OPERATIONS 525-540 may be applicable to certain types of documents 105, for example, to word processing documents or other types of documents containing data in paragraphs. Upon expansion of the selection 640 (530,540), a comment edit box 650 may be provided and focus may be placed in the comment edit box (545) (as shown in FIG. 6B). Also as illustrated in FIG. 6B, comments 210 below the comment edit box 650 may be shifted down in the comments pane 205 to make room for the comments edit box.

The method 500 proceeds to OPERATION 550, where an anchor 230 and a hint 225 are displayed on the document image 140. As described above, anchors 230 and hints 225 may be displayed as an HTML overlay over the document image 140. The positions of anchors 230 and hints 225 may be communicated in XML files 145 provided from the server 110. When a comment edit box 650 is provided and focus is placed in the comment edit box, the "new comment" command 625 as well as the ability to select other comments 210 and hints 225 may be disabled (555).

The method 500 continues onto FIG. 5B. Upon receiving an indication of typing (560), for example, a user 130 adding a comment into the comment edit box 650, a determination is made to verify whether a comment 210 has been committed (565). A comment 210 may be committed via a variety of methods, for example, when the comment is saved or when focus is selected away from the entered comment. If it is determined that the comment 210 has not been committed, and if an indication of a cancel command has not been received (570), the method 500 may return to OPERATION 560. If a cancel command is received (570), the method 500 may return to the start OPERATION 505. If at OPERATION 565 a determination is made that the comment 210 has been committed, the comment may be added to the document 105 on the server 110, as well as other metadata, which may include but is not limited to, user data, anchor position, and a timestamp (575). At OPERATION 580, the comment 210 may be rendered as a selected comment 410.

According to an embodiment, upon receiving an indication to add a comment 210, a request may be sent to the server 110 to determine if the document 105 is in a state to allow for comments, for example, if the document 105 is password protected. If the document 105 is not in a state to allow for comments, an error message may be provided to the user 130. Alternatively, if the document 105 is in condition for coming, a block or a cooperative block may be taken on the server 110 to allow for comments to be written to the file and for co-authoring on the document for users 130 requesting the document 105 at the same time. The method 500 ends at OPERATION 595.

Figure 7:
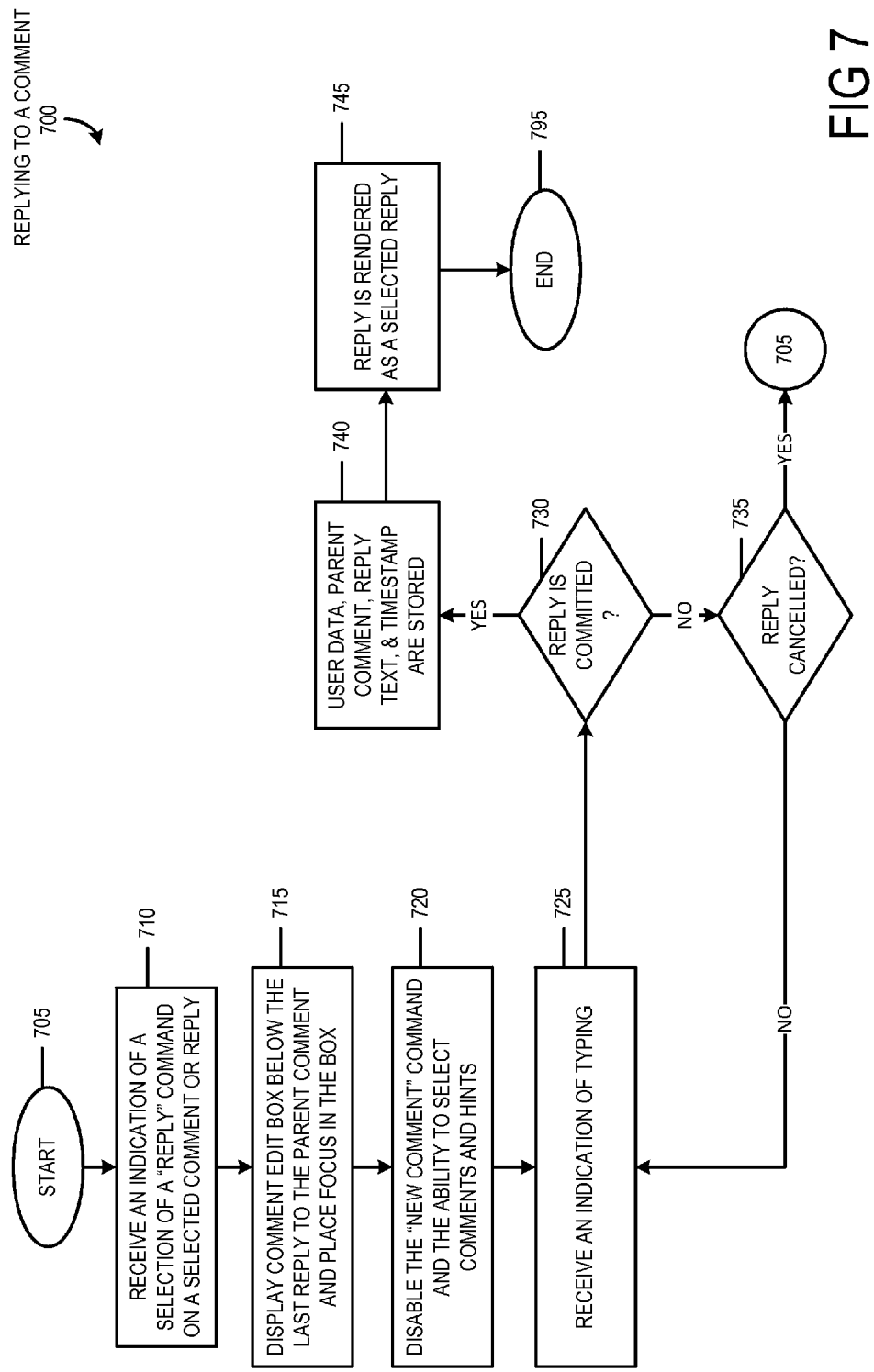
FIG. 7 is a flowchart of a method for replying to a comment via a thin client according to an embodiment.
Figure 8:
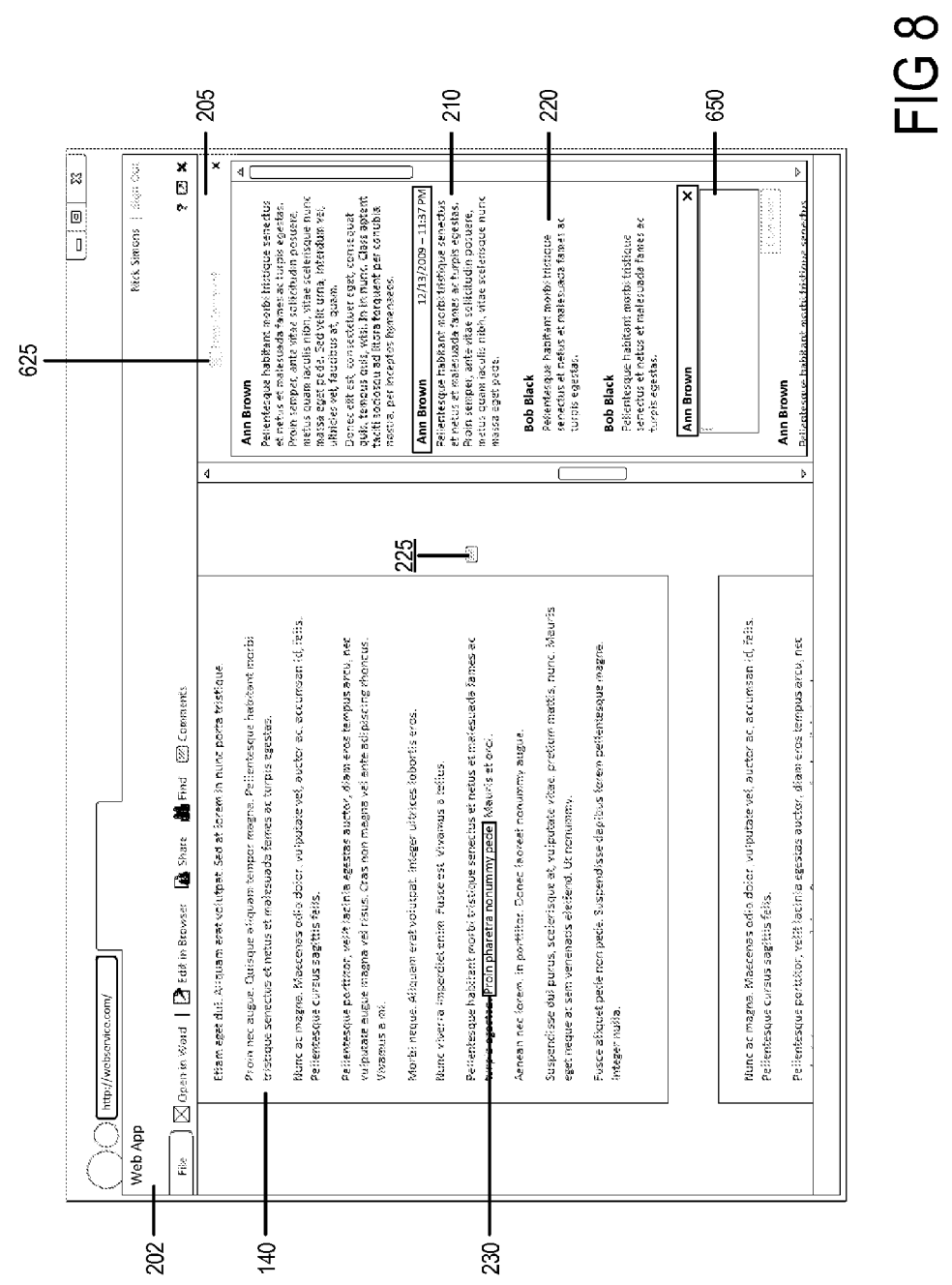

Embodiments of the present invention provide for replying to a comment. FIG. 7 illustrates a flowchart of a method 700 for replying to a comment via a thin client 135. Reference may be made to FIG. 8, which is an illustration of an example screenshot of a document image 140 and comments 210, replies 220 to comments, and a comment edit box 650 displayed in a comments pane 205. Referring now to FIG. 7, the method 700 starts at OPERATION 705. At OPERATION 710, an indication of a selection to reply to a comment 210 may be received. According to embodiments, an indication of a selection to reply to a comment 210 may be a selection of a "reply" command 450 (illustrated in FIG. 4B) on a selected comment 410 or reply 220, may be a selection of a "new comment" command 625 when a comment 210 or reply 220 is selected, or via a selection of a keyboard command. Upon receiving an indication of a selection to reply to a comment 210 or reply 220 (710), a comment edit box 650 may be displayed below the last reply 220 to the parent comment 210 (715) (illustrated in FIG. 8). When the comment edit box 650 is displayed, commands such as the "new comment" command 625 and the ability to select comments 210 and hints 220 may be disabled (720).

At OPERATION 725, an indication of typing of a reply 220 may be received. If the reply has not been committed (730) and if the reply has not been cancelled (735), the method 700 may return to OPERATION 725. If the reply has not been committed (730) and if an indication is received that the reply has been cancelled (735), the method 700 may return to the start OPERATION 705. Alternatively, if at DECISION OPERATION 730 it is determined that the reply has been committed, the reply 220 may be added to the document 105 on the server 110, as well as other metadata which may include, but is not limited to, user data, the parent comment 210, and a timestamp (740). The reply 220 may then be rendered as a selected reply in the comments pane 205 (745). According to one embodiment, the latest committed reply 220 may be displayed below other replies that are associated with a comment. The method 700 ends at OPERATION 795.

Embodiments of the present invention provide for various user interface (UI) controls in addition to the commands described above. For example, and with reference now to FIG. 9A, when a comment 210 or reply 220 is selected, a delete command 905, a reply command 910, and a done command 915 may be provided in the comments pane 205. According to one embodiment and as illustrated, the delete 905, reply 910, and done 915 commands may be displayed below the selected comment 410 or reply 220. Selection of the delete command 905 may delete the selected comment 410 or reply 220. If a selected comment 410 has children, that is, if there are replies 220 associated with the selected comment, and if the comment is deleted by selection of the delete command 905, the children, or replies associated with the comment, may also be deleted. Accordingly, the anchor 230 and hint 225 associated with the deleted comment and anchors and hints associated with children replies may also be deleted. According to an embodiment, a warning dialog may be provided to warn a user that a comment and its replies are about to be deleted.

Figures 9A, 9B:
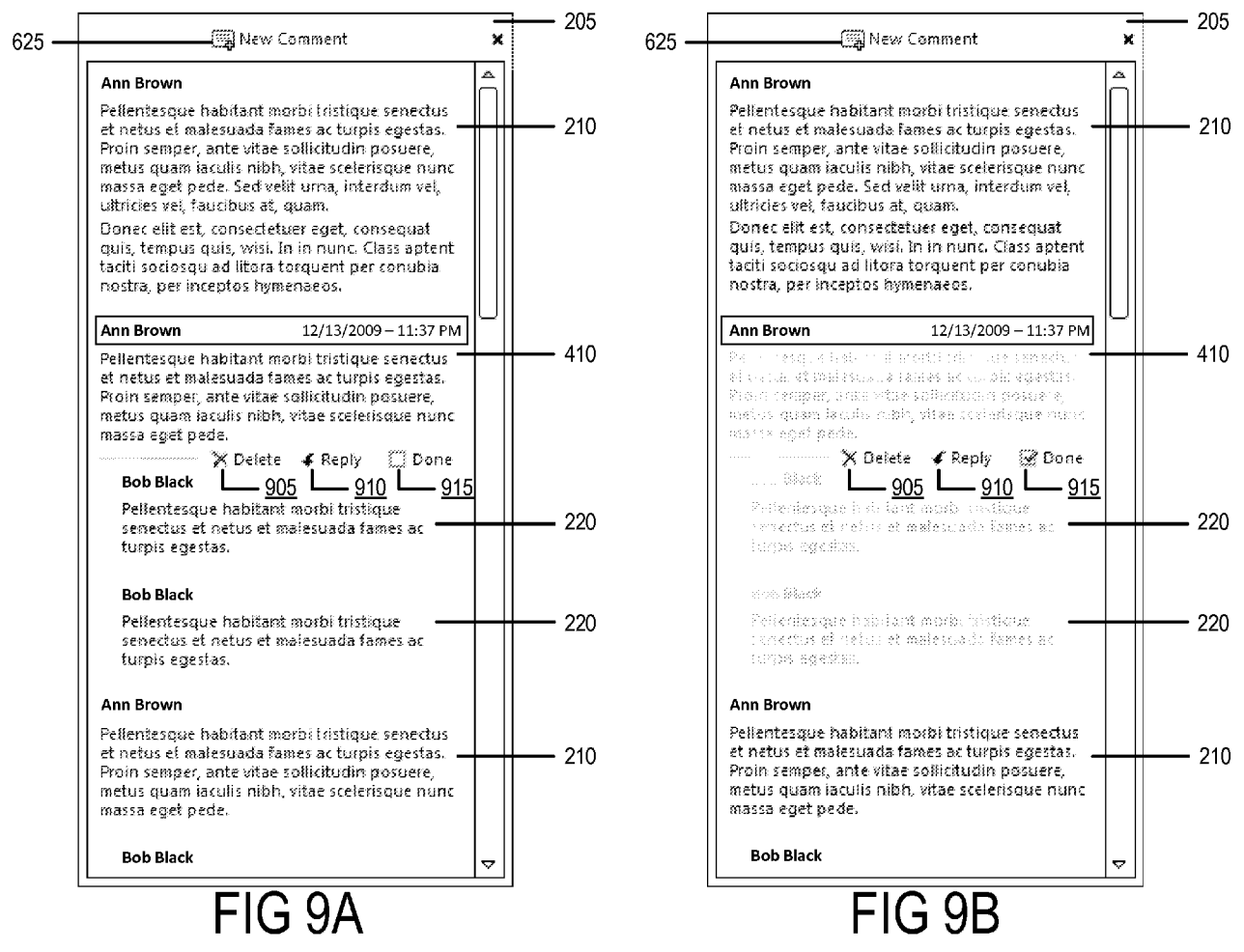

The reply command 910 may be utilized to reply to a comment 210 or reply 220. Reference may be made back to FIG. 7 and the method 700 for a description of a method for replying to a comment via a selection of a reply command 910 according to an embodiment. Selection of the done command 915 may change the state of a selected comment 410 to done. For example, if a comment suggests to correct the spelling of a word in a document 105, when a user 130 corrects the spelling of the word, he/she may mark the comment as done. If a selected comment 410 has children, or has replies 220 associated with it, and if the selected comment is marked done, the replies associated with the comment may also be marked done as illustrated in FIG. 9B. According to an embodiment, as also as illustrated in FIG. 9B, a comment 210 or reply 220 selected as done may be grayed out or modified in other ways known in the art to distinguish it from other comments and replies that have not been selected as done. The done command 915 may be reselected to change the state of a comment or reply to undone.

Figure 10:
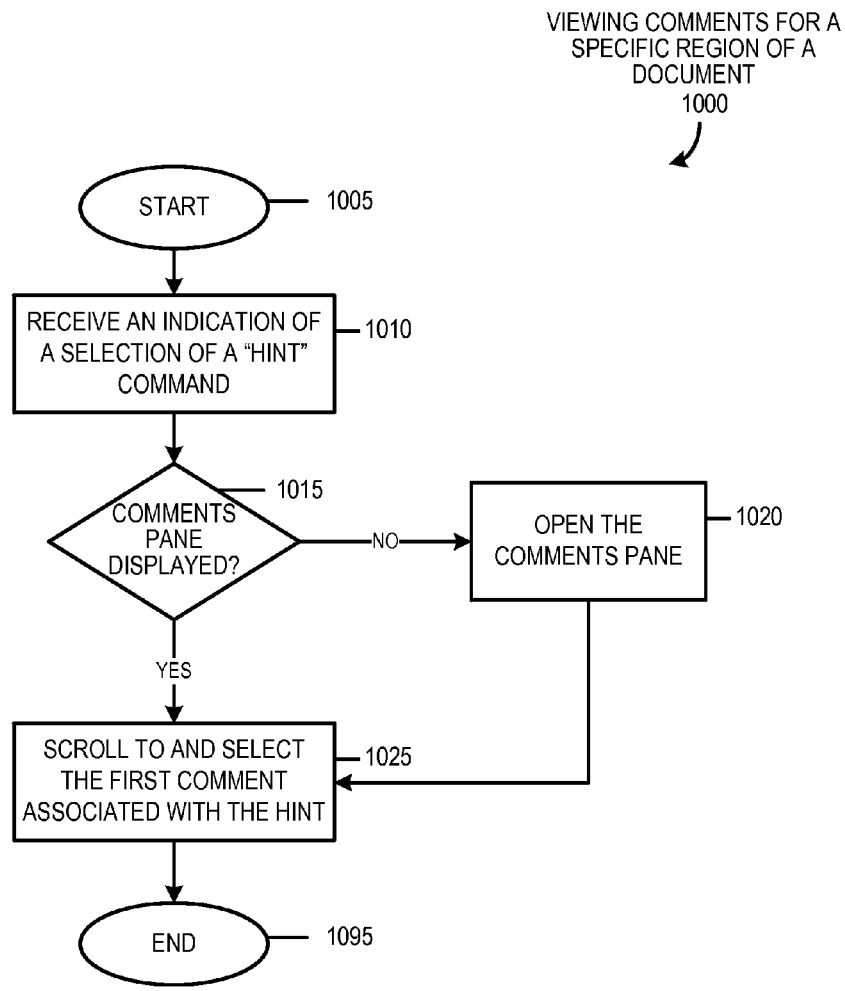
FIG. 10 is a flowchart of a method for selecting a comment via selection of a hint.
Figure 11:
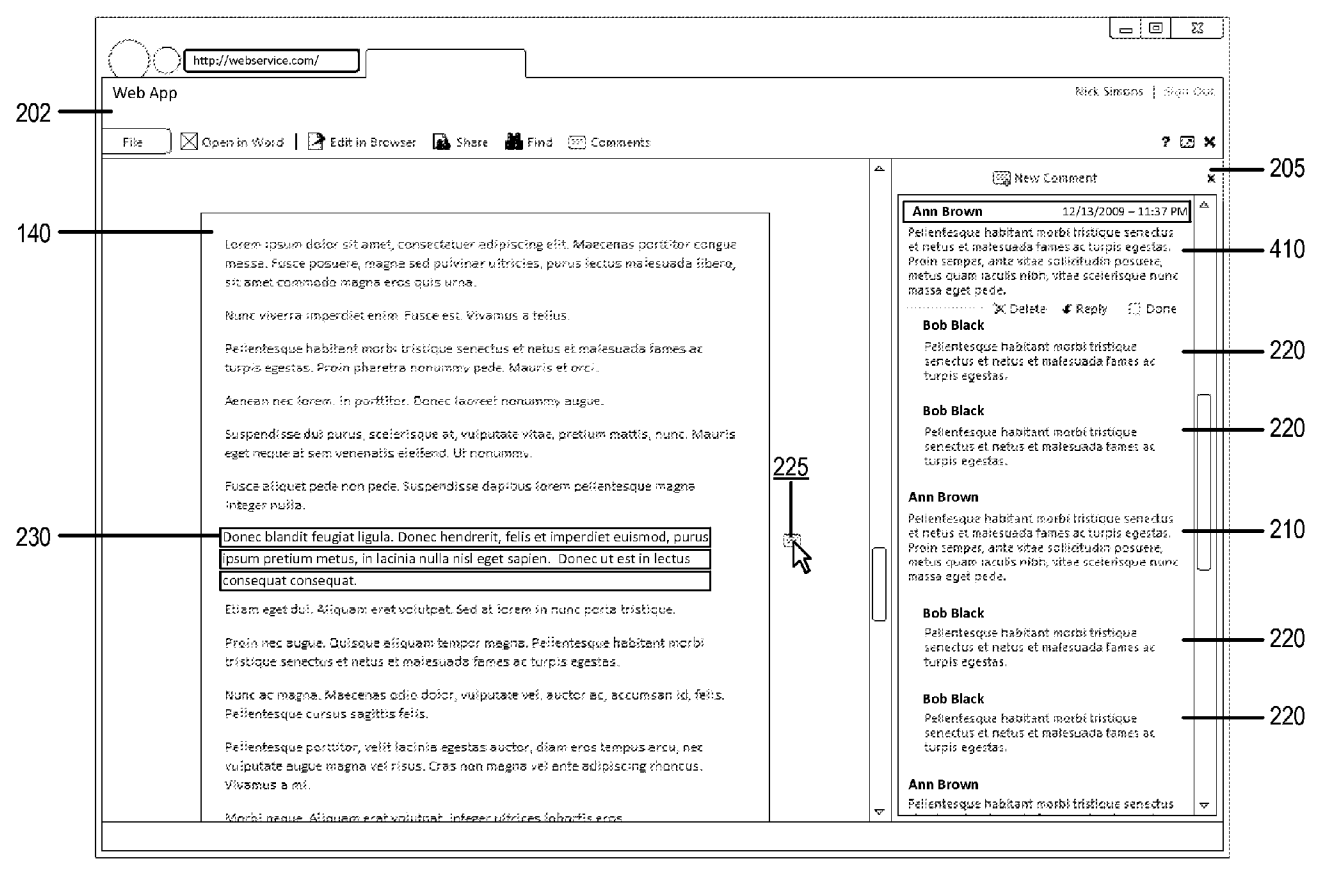

The illustrations and discussions of FIGS. 3, 4A, and 4B describe a method of selecting a comment 210 via selection of the comment in the comments pane 205. According to another embodiment, and as described with respect to FIGS. 10 and 11, a comment 210 may be selected via a selection of a selectable hint icon 225 associated with the comment. Referring now to FIG. 10, method 1000 for selecting a comment 210 via selection of a hint 225 starts at OPERATION 1005. A user 130 may select a hint 225 (1010), for example, a user may click on a hint via a mouse as illustrated in FIG. 11. If the comments pane 205 is not currently displayed (1015), at OPERATION 1020, the comments pane may be opened and displayed to a side of the document image 140. According to embodiments, the comments pane 205 may be an HTML pane. Upon opening the comments pane 205 or if the comments pane is already displayed, the comments pane may be scrolled to the first comment 210 associated with the selected hint 225, and the comment may be selected (1025). Accordingly, the selected comment 410 may be highlighted, and an anchor 230 may be displayed as an HTML overlay over the element(s) in the document 105 associated with the selected comment. The method ends at OPERATION 1095.

Figure 12:
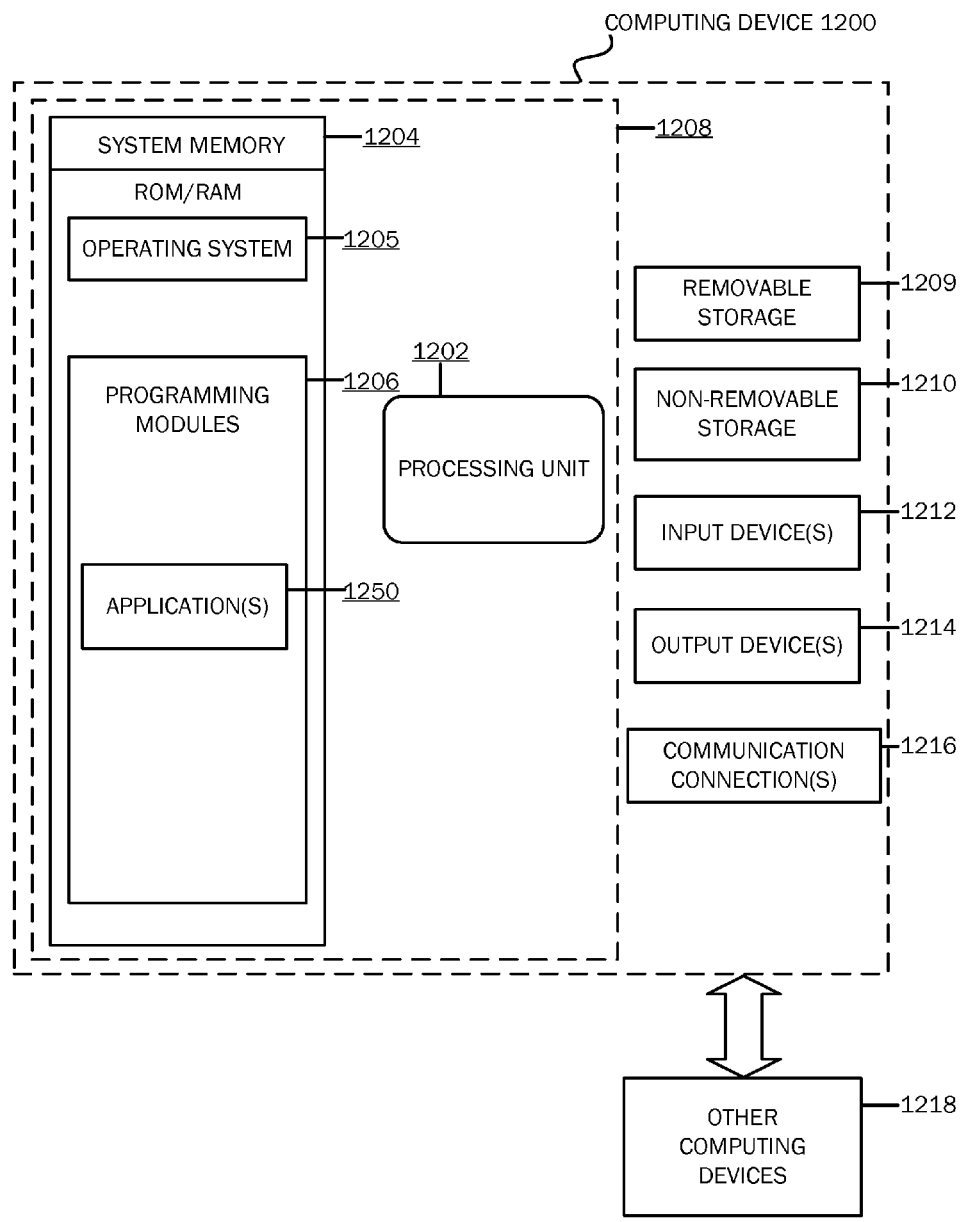
FIG. 12 is a simplified block diagram illustrating example physical components of a computing device with which embodiments of the invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 12-14 and the associated descriptions provide a discussion of a variety of operating environments in which embodiments of the invention may be practiced. However, the devices and systems illustrated and discussed with respect to FIGS. 12-14 are for purposes of example and illustration and are not limiting of a vast number of computing device configurations that may be utilized for practicing embodiments of the invention, described herein.

FIG. 12 is a block diagram illustrating example physical components of a computing device 1200 with which embodiments of the invention may be practiced, for example, client device 125 and server 110. In a basic configuration, computing device 1200 may include at least one processing unit 1202 and a system memory 1204. Depending on the configuration and type of computing device, system memory 1204 may comprise, but is not limited to, volatile (e.g. random access memory (RAM)), non-volatile (e.g. read-only memory (ROM)), flash memory, or any combination. System memory 1204 may include operating system 1205, one or more programming modules 1206, and may include one or more applications 1250. For example, the one or more applications 1250 may include, but is not limited to, collaborative software 112, a web application 115, a web browser application 135, a word processing application, a spreadsheet application, a database application, an email application, a slideshow presentation application, a web design application, a drawing application, etc. Operating system 1205, for example, may be suitable for controlling computing device 1200's operation. Furthermore, embodiments of the invention may be practiced in conjunction with a graphics library, other operating systems, or any other application program and is not limited to any particular application or system. This basic configuration is illustrated in FIG. 12 by those components within a dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computing device 1200 may also contain a communication connection 1216 that may allow device 1200 to communicate with other computing devices 1218, such as over a network 120 in a distributed computing environment, for example, an intranet or the Internet. Communication connection 1216 is one example of communication media.

As stated above, a number of program modules and data files may be stored in system memory 1204, including operating system 1205. While executing on processing unit 1202, programming modules 1206, such as application(s) 112, 115, 135 may perform processes including, for example, one or more methods 300's, 500's, 700's and 1000's operations as described above. The aforementioned process is an example, and processing unit 1202 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to application(s) 112,115,135 may be operated via application-specific logic integrated with other components of the computing device/system 1200 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. Computing device 1200 may also have input device(s) 1212 such as a keyboard, a mouse, a pen, a sound input device, a touch input device, etc. Output device(s) 1214 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13A:
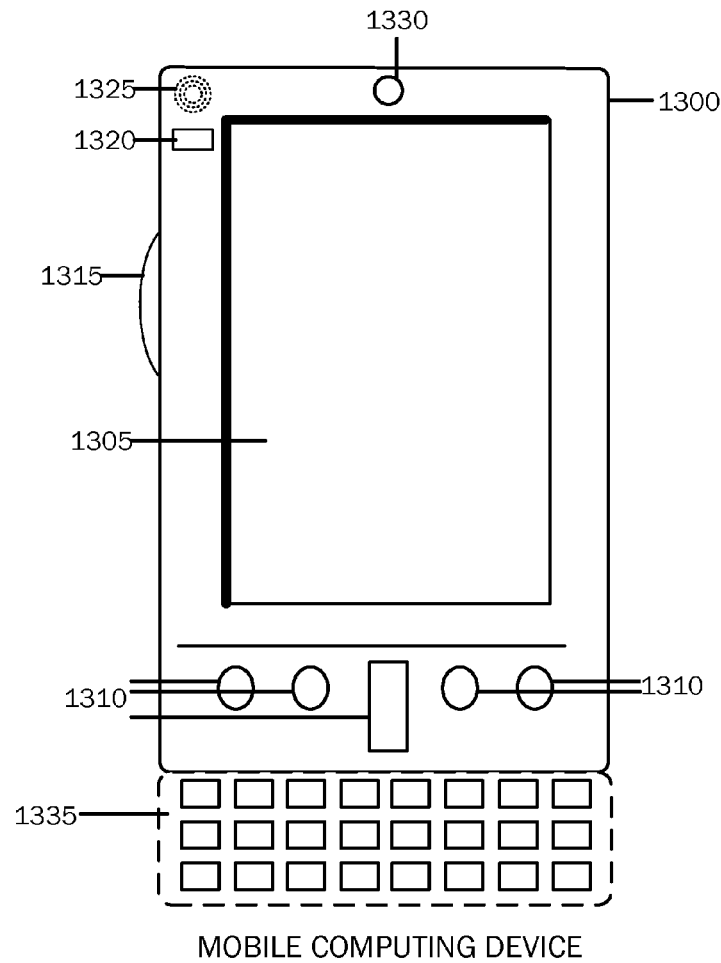
FIGS. 13A-13B are simplified block diagrams of a mobile computing device with which embodiments of the present invention may be practiced.
Figure 13B:
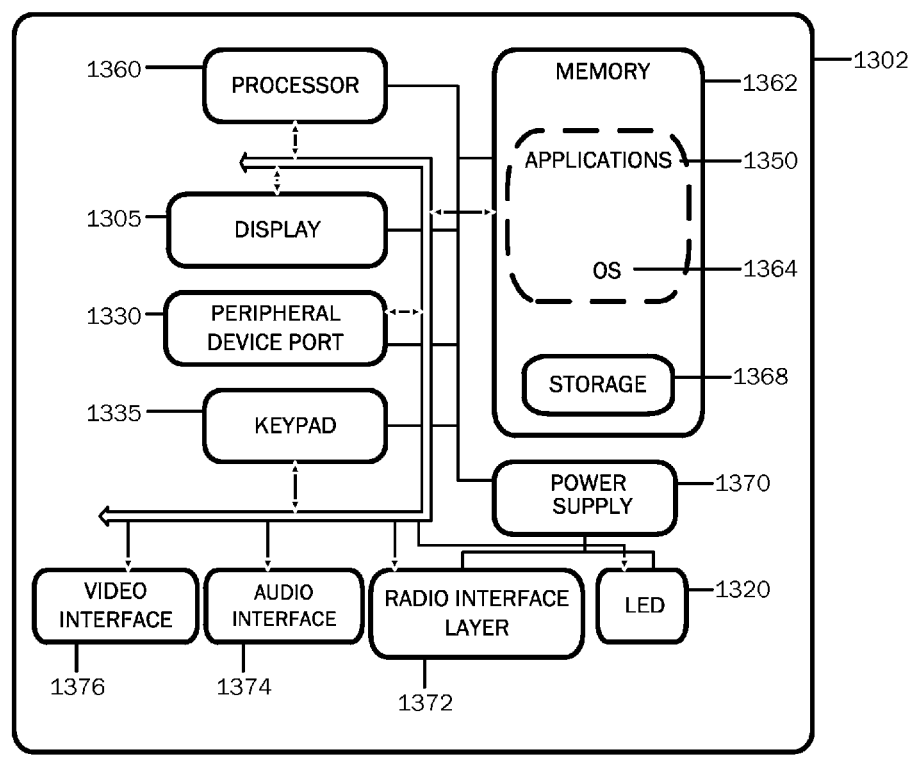
Figure 14:
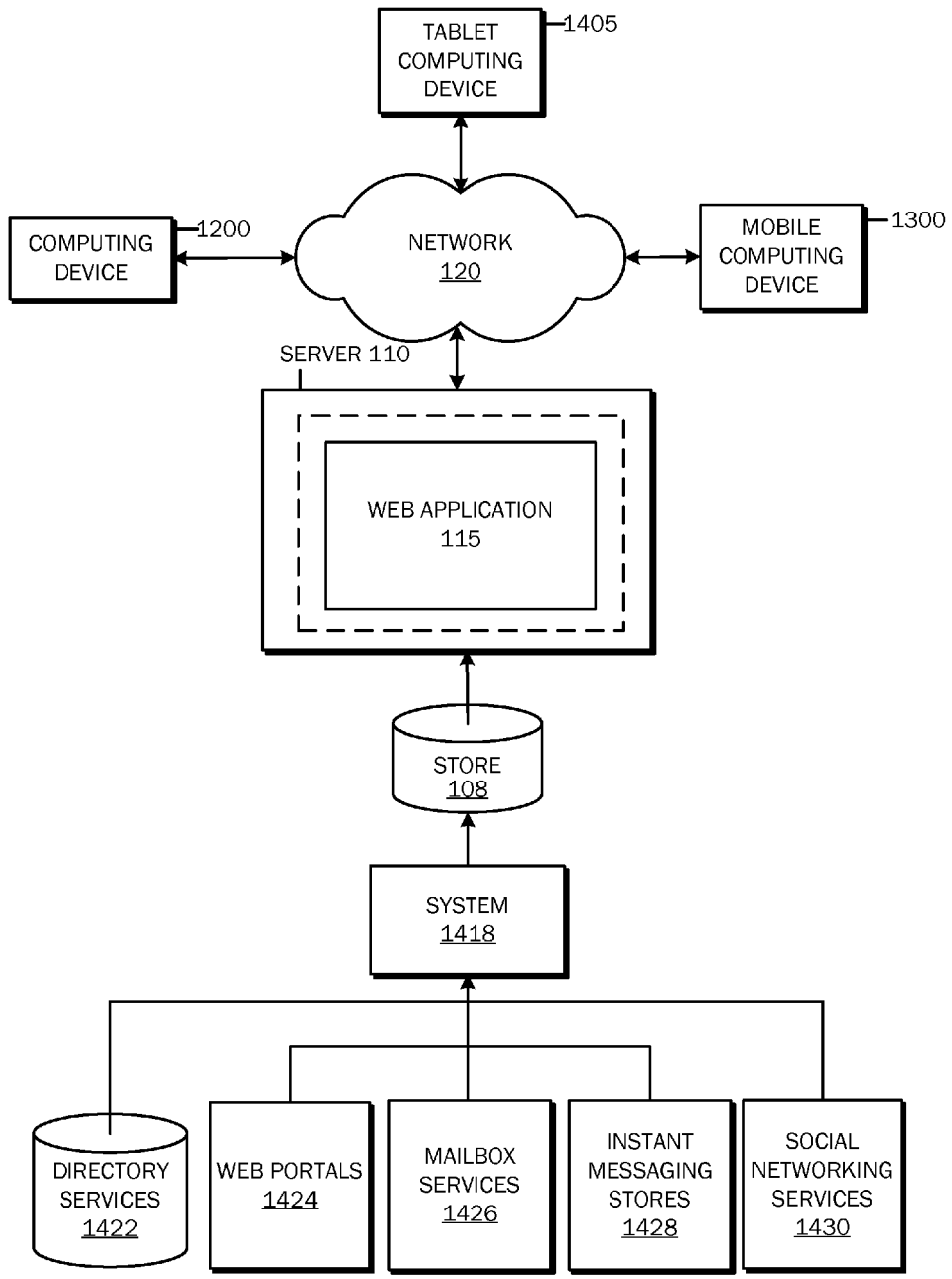
FIG. 14 is a simplified block diagram of a distributed computing system in which embodiments of the present invention may be practiced.

FIGS. 13A and 13B illustrate a suitable mobile computing environment, for example, a mobile telephone 1300, a smartphone, a tablet personal computer, a laptop computer, and the like, with which embodiments of the invention may be practiced. With reference to FIG. 13A, an example mobile computing device 1300 for implementing the embodiments is illustrated. In a basic configuration, mobile computing device 1300 is a handheld computer having both input elements and output elements. Input elements may include touch screen display 1305 and input buttons 1310 that allow the user to enter information into mobile computing device 1300. Mobile computing device 1300 may also incorporate an optional side input element 1315 allowing further user input. Optional side input element 1315 may be a rotary switch, a button, or any other type of manual input element. In alternative embodiments, mobile computing device 1300 may incorporate more or less input elements. For example, display 1305 may not be a touch screen in some embodiments. In yet another alternative embodiment, the mobile computing device is a portable phone system, such as a cellular phone having display 1305 and input buttons 1315. Mobile computing device 1300 may also include an optional keypad 1335. Optional keypad 1335 may be a physical keypad or a "soft" keypad generated on the touch screen display.

Mobile computing device 1300 incorporates output elements, such as display 1305, which can display a graphical user interface (GUI). Other output elements include speaker 1325 and LED light 1320. Additionally, mobile computing device 1300 may incorporate a vibration module (not shown), which causes mobile computing device 1300 to vibrate to notify the user of an event. In yet another embodiment, mobile computing device 1300 may incorporate a headphone jack (not shown) for providing another means of providing output signals.

Although described herein in combination with mobile computing device 1300, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices.

FIG. 13B is a block diagram illustrating components of a mobile computing device used in one embodiment, such as the computing device shown in FIG. 13A. That is, mobile computing device 1300 can incorporate system 1302 to implement some embodiments. For example, system 1302 can be used in implementing a "smart phone" that can run one or more applications similar to those of a desktop or notebook computer such as, for example, browser, e-mail, scheduling, instant messaging, and media player applications. In some embodiments, system 1302 is integrated as a computing device, such as an integrated personal digital assistant (PDA) and wireless phone.

One or more application programs 1350, for example, a web browser application 135, may be loaded into memory 1362 and run on or in association with operating system 1364. Examples of application programs include phone dialer programs, e-mail programs, PIM (personal information management) programs, electronic mail and contacts applications, word processing applications, spreadsheet applications, database applications, slide presentation applications, drawing or computer-aided application programs, messaging programs, and so forth. System 1302 also includes non-volatile storage 1368 within memory 1362. Non-volatile storage 1368 may be used to store persistent information that should not be lost if system 1102 is powered down. Applications 1350 may use and store information in non-volatile storage 1368, such as e-mail or other messages used by an e-mail application, and the like. A synchronization application (not shown) also resides on system 1302 and is programmed to interact with a corresponding synchronization application resident on a host computer to keep the information stored in non-volatile storage 1368 synchronized with corresponding information stored at the host computer. As should be appreciated, other applications may be loaded into memory 1362 and run on the device 1300.

System 1302 has a power supply 1370, which may be implemented as one or more batteries. Power supply 1370 might further include an external power source, such as an AC adapter or a powered docking cradle that supplements or recharges the batteries.

System 1302 may also include a radio 1372 that performs the function of transmitting and receiving radio frequency communications. Radio 1372 facilitates wireless connectivity between system 1302 and the "outside world", via a communications carrier or service provider. Transmissions to and from radio 1372 are conducted under control of OS 1364. In other words, communications received by radio 1372 may be disseminated to application programs 1350 via OS 1364, and vice versa.

Radio 1372 allows system 1302 to communicate with other computing devices, such as over a network. Radio 1372 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1302 is shown with two types of notification output devices; LED 1320 that can be used to provide visual notifications and an audio interface 1374 that can be used with speaker 1325 to provide audio notifications. These devices may be directly coupled to power supply so that when activated, they remain on for a duration dictated by the notification mechanism even though processor 1360 and other components might shut down for conserving battery power. LED 1320 may be programmed to remain on indefinitely until the user takes action to indicate the powered-on status of the device. Audio interface 1374 is used to provide audible signals to and receive audible signals from the user. For example, in addition to being coupled to speaker 1325, audio interface 1374 may also be coupled to a microphone to receive audible input, such as to facilitate a telephone conversation. In accordance with embodiments of the present invention, the microphone may also serve as an audio sensor to facilitate control of notifications, as will be described below. System 1302 may further include video interface 1376 that enables an operation of on-board camera 1330 to record still images, video stream, and the like.

A mobile computing device implementing system 1302 may have additional features or functionality. For example, the device may also include additional data storage devices (removable and/or non-removable) such as, magnetic disks, optical disks, or tape. Such additional storage is illustrated in FIG. 13B by storage 1368. Computer storage media may include volatile and nonvolatile, removable and non-removable media implemented in any method or technology for storage of information, such as computer readable instructions, data structures, program modules, or other data.

Data/information generated or captured by the device 1300 and stored via the system 1302 may be stored locally on the device 1300, as described above, or the data may be stored on any number of storage media that may be accessed by the device via the radio 1372 or via a wired connection between the device 1300 and a separate computing device associated with the device 1300, for example, a server computer 110 in a distributed computing network 120, such as the Internet. As should be appreciated such data/information may be accessed via the device 1300 via the radio 1372 or via a distributed computing network 120. Similarly, such data/information may be readily transferred between computing devices for storage and use according to well-known data/information transfer and storage means, including electronic mail and collaborative data/information sharing systems 112.

FIG. 14 illustrates a system architecture for storing and updating content to enable commenting via a thin client 135, as described above. Content developed, interacted with or edited in association with an application 115 may be stored in different communication channels or other storage types. For example, various content items along with information from which they are developed may be stored using directory services 1422, web portals 1424, mailbox services 1426, instant messaging stores 1428 and social networking sites 1430. A system 1418 may use any of these types of systems or the like for providing commenting functionalities, as described herein. A server 110 may receive requests to run an application 115 and pass items to clients 125. As one example, server 110 may be a web server providing content over the web. Server 110 may provide content over the web to client devices 125 through a network 120. Examples of clients that may obtain content include computing device 1200, which may include any general purpose personal computer, a tablet computing device 1405 and/or mobile computing device 1300 which may include smart phones. Any of these devices may obtain content from the store 108.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method executed by a computer processor for collaboratively commenting via a thin client application, the method comprising:
    receiving a document;
    receiving a request from the thin client application to view the document;
    sending an image of the document to the thin client application; and
    sending one or more comments and information that associates each comment with a location in the document where the comment is anchored to the thin client application, the comments and information sent in an extensible markup language (XML) file, such that a selectable control representing the location of a comment is displayed at a location near the location of the anchor as a hypertext markup language (HTML) overlay over the image of the document, wherein a pane displayed proximate to the image of the document includes the one or more comments and selection of one of the one or more comments causes the display to scroll to a portion of the document at the location of the anchor associated with the one of the one or more comments and providing an HTML overlay, over a portion of the image of the document, that highlights the anchor of the selected comment.

2. The method of claim 1, further comprising upon receiving an indication of a selection of the selectable control representing the location of a comment in the document, providing an HTML pane displayed to a side of the image of the document, the pane displaying the one or more comments in the document.

3. The method of claim 2, wherein the one or more comments in the pane are scrolled to the comment associated with the selected control representing the location of the comment in the document.

4. The method of claim 2, further comprising upon receiving indication of a selection of the selectable control representing the location of a comment in the document, providing an HTML overlay over a portion of the image of the document, the HTML overlay displayed as highlighting over the anchor of the comment associated with the selected control representing the location of the comment in the document.

5. The method of claim 1, further comprising:
    providing a user interface component for allowing a user to add a comment to the document;
    receiving an indication of a committal of a comment to the document; saving the comment to the document;
    saving information that associates the comment with a location in the document where the comment is anchored; and
    sending the information that associates the comment with the location in the document where the comment is anchored to the thin client application, such that a selectable control representing the location of the comment is displayed at a location near the location of the anchor as an HTML overlay over the image of the document and highlighting is displayed over the anchor of the comment as an HTML overlay over the image of the document.

6. The method of claim 1, further comprising:
    providing a user interface component for allowing a user to reply to a comment in the document;
    receiving an indication of a committal of a reply to the comment;
    saving the reply to the document; and
    saving information that associates the reply with a parent comment in the document.

7. The method of claim 1, further comprising:
    providing a user interface component for allowing a user to mark a comment as done;
    receiving an indication of a selection of the user interface component for allowing a user to mark a comment as done;
    changing the state of the comment to done; and
    if the comment has replies associated with it, changing the state of the replies associated with the comment to done.

8. The method of claim 1, further comprising:
    providing a user interface component for allowing a user to delete a comment;
    receiving an indication of a selection of the user interface component for deleting a comment;
    deleting the comment; and
    if the comment has replies associated with it, deleting the replies associated with the comment.

9. A system for collaboratively commenting via a thin client application, the system comprising:
    a data store that stores a document accessible from one or more thin client applications;
    a server comprising:
    a processor and a computer-readable medium;
    an operating environment stored on the computer-readable medium and executing on the processor; and
    an application executed by the processor to:
        receive a document;
        open the document from the data store;

receive a request from the thin client application to view the document;

send an image of the document to the thin client application; and send one or more comments and information that associates each comment with a location in the document where the comment is anchored to the thin client application, the comments and information sent in an extensible markup language (XML) file, such that a selectable control representing the location of a comment is displayed at a location near the location of the anchor as a hypertext markup language (HTML) overlay over the image of the document, wherein a pane displayed proximate to the image of the document includes the one or more comments and selection of one of the one or more comments causes the display to scroll to a portion of the document at the location of the anchor associated with the one of the one or more comments and providing an HTML overlay, over a portion of the image of the document, that highlights the anchor of the selected comment.

10. The system of claim 9, the application further executed by the processor to provide an HTML pane displayed to a side of the image of the document upon receiving an indication of a selection of the selectable control representing the location of a comment in the document, the pane displaying the one or more comments in the document.

11. The system of claim 10, wherein the one or more comments in the pane are scrolled to the comment associated with the selected control representing the location of the comment in the document.

12. The system of claim 10, the application further executed by the processor to provide an HTML overlay over a portion of the image of the document upon receiving an indication of a selection of the selectable control representing the location of a comment in the document, the HTML overlay displayed as highlighting over the anchor of the comment associated with the selected control representing the location of the comment in the document.

13. The system of claim 9, the application further executed by the processor to:

receive an indication of a committal of a comment to the document; save the comment to the document;

save information that associates the comment with a location in the document where the comment is anchored; and send the information that associates the comment with the location in the document where the comment is anchored to the thin client application, such that a selectable control representing the location of the comment is displayed at a location near the location of the anchor as an HTML overlay over the image of the document and highlighting is displayed over the anchor of the comment as an HTML overlay over the image of the document.

14. The system of claim 9, the application further executed by the processor to:

provide a user interface component for allowing a user to reply to a comment in the document;

receive an indication of a committal of a reply to the document;

save the reply to the document; an save information that associates the reply with a parent comment in the document.

15. A computer readable hardware storage device containing computer executable instructions which when executed by a computer perform a method collaboratively commenting via a thin client application, comprising:

receiving an image of the document at the thin client application;

receiving one or more comments and information that associates each comment with a location in the document where the comment is anchored to the thin client application, the comments and information sent in an extensible markup language (XML) file, such that a selectable control representing the location of a comment is displayed at a location near the location of the anchor as a hypertext markup language (HTML) overlay over the image of the document and the one or more comments are displayed in a pane displayed proximate to the image of the document;

in response to receiving a selection of the selectable control, displaying the one or more comments associated with the selectable control; and in response to receiving a selection of one of the one or more comments, displaying a portion of the document at the location of the anchor associated with the one of the one or more comments and providing an HTML overlay, over a portion of the image of the document, that highlights the anchor of the selected comment.

16. The computer readable storage device of claim 15, further comprising in response to receiving a selection of the selectable control, providing an HTML pane displayed to a side of the image of the document, the pane displaying the one or more comments in the document.

17. The computer readable storage device of claim 15, further comprising providing an HTML pane displayed to a side of the image of the document, the pane displaying the one or more comments in the document.

* * * * *